Figure 1:
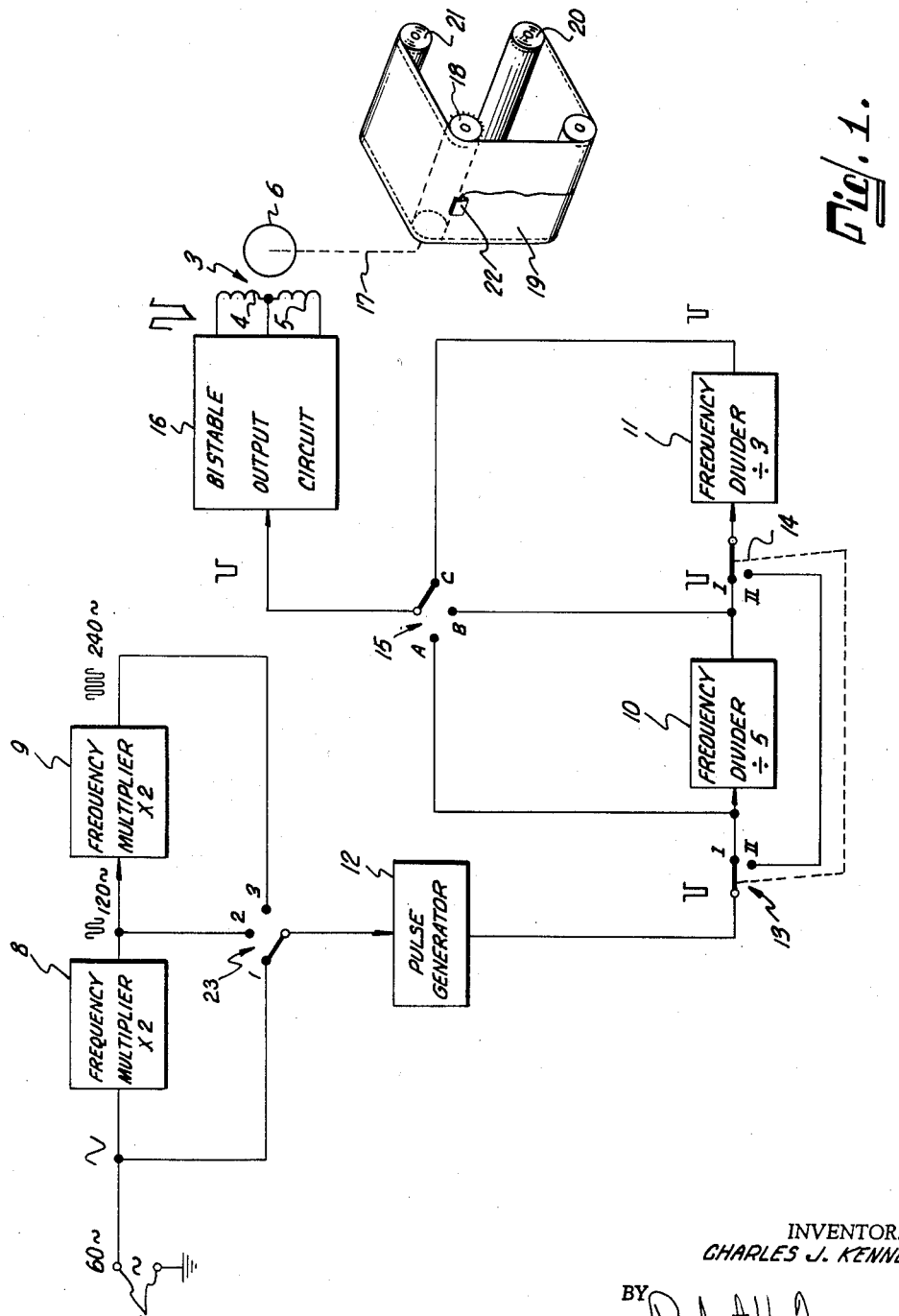

July 19, 1960

C. J. KENNEDY 2,945,997

GRAPHICAL RECORDER CHART MOTOR DRIVE SYSTEM

Filed Nov. 1, 1957

2 Sheets-Sheet 1

INVENTOR.
CHARLES J. KENNEDY

BY Robert H. Fraser
ATTORNEY.

July 19, 1960

C. J. KENNEDY 2,945,997

GRAPHICAL RECORDER CHART MOTOR DRIVE SYSTEM

Filed Nov. 1, 1957

2 Sheets-Sheet 2

INVENTOR.
CHARLES J. KENNEDY

BY Robert H. Fraser

ATTORNEY.

United States Patent Office 2,945,997
Patented July 19, 1960

2,945,997
GRAPHICAL RECORDER CHART MOTOR DRIVE SYSTEM

Charles J. Kennedy, Pasadena, Calif., assignor to F. L. Moseley Co., a corporation of California Filed Nov. 1, 1957, Ser. No. 693,923

11 Claims. (Cl. 318—341)

This invention relates to variable speed drive systems and more particularly to a system for transporting a record medium in a graphical recorder at selected speeds.

Where it is necessary to drive a mechanism at various rates of speed from a single electrical motor which is energized from alternating current of constant frequency, it is well known to link the motor to the mechanism by a speed changer such as a transmission containing a number of gears having various ratios. For some applications, a gear box is not a suitable device for changing the speed at which a mechanism is driven for the reason that a certain amount of time is required to switch from one gear ratio to another. In addition, the gears are relatively expensive to machine and where many different ratios must be provided, the gears tend to place a large frictional load on the motor.

Need for a versatile motor drive system which is capable of operating at many different and widely divergent speeds is particularly acute in the field of graphical recorders where a record medium, such as a strip of graph paper, is transported past a fixed station at which is located a pen or a marking element which draws a graph on the paper in accordance with the variations in a quantity as a function of time.

Accordingly, it is one object of the present invention to provide a new and improved motor control system in which a stepping motor is adapted to be driven at selected speeds.

It is another object of the present invention to provide a new and improved drive system for transporting a record medium in a graphical recorder.

It is still another object of the present invention to provide an electrical circuit by means of which a stepping motor may be driven in accordance with an electrical wave having a frequency which bears a multiple or fractional relationship to the frequency of an alternating current wave from a source of supply.

Briefly, in accordance with the invention, a drive system is provided including a stepping motor and a plurality of frequency multipliers and frequency dividers. Alternating current from a source of alternating current is applied to the frequency multipliers and dividers in such a way as to generate an alternating current wave of various frequencies bearing a multiple or fractional relationship to the frequency of the alternating current wave from the source of supply. By interconnecting various ones of the frequency multipliers and frequency dividers, and generating pulses in accordance with the generated alternating current wave, the stepping motor is driven at a selected rate of speed which may be instantaneously and readily changed by varing the interconnection between the frequency multipliers and frequency dividers.

In a particular embodiment, a record medium, such as a strip of graph paper in a graphical recorder, is transported past a fixed station by the stepping motor which is driven from a source of line frequency voltage via various selected combinations of frequency multipliers and dividers so as to achieve various speeds of movement of the record medium.

Figure 2:
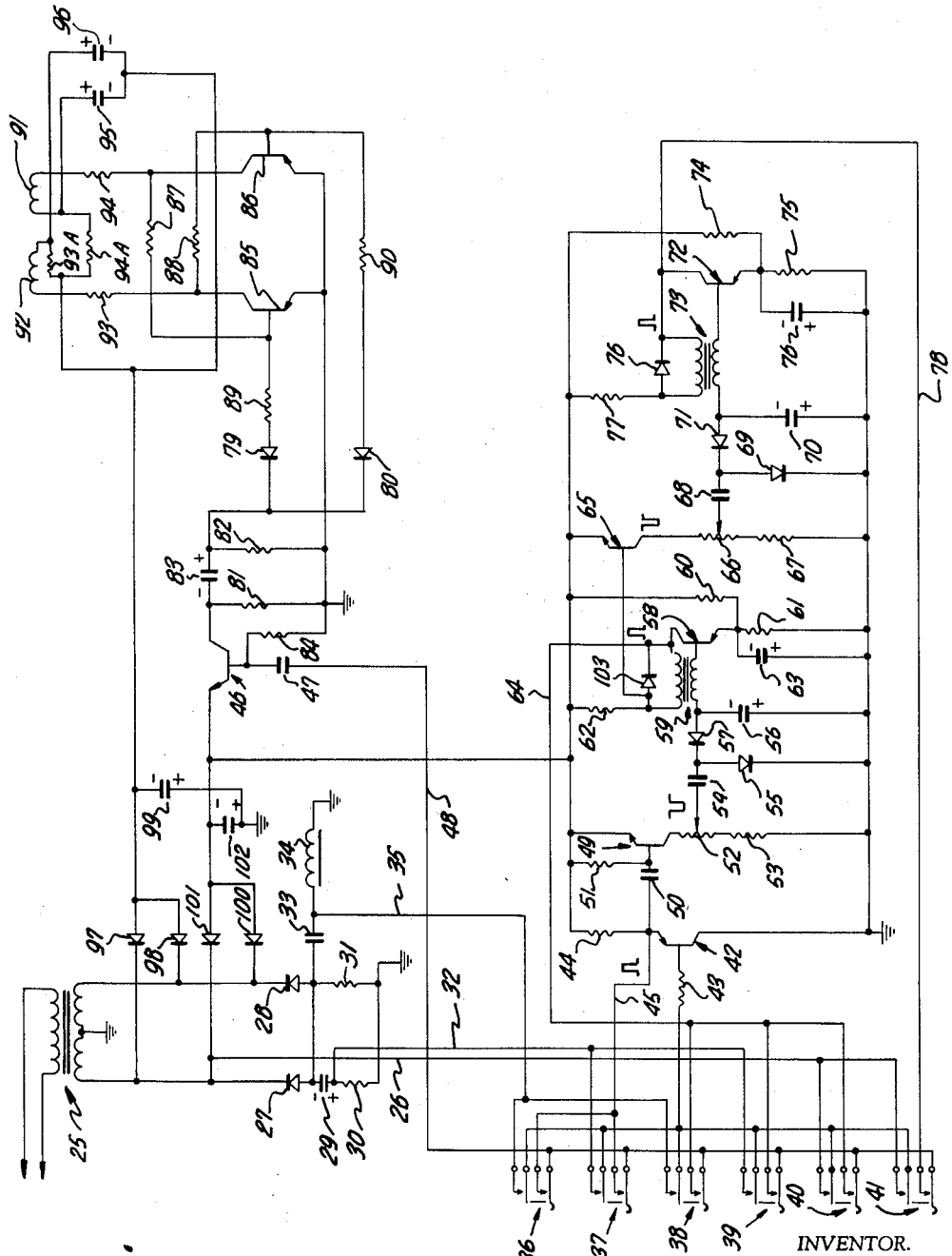

A better understanding of the invention may be had upon a reading of the following detailed description and an inspection of the drawings, in which:

Fig. 1 is a combined block and diagrammatic view of a system for transporting a record medium in accordance with the invention; and Fig. 2 is a schematic circuit diagram of a particular system for energizing a stepping motor to transport a record medium at several selected speeds.

In the motor drive system of the invention illustrated in Fig. 1, there is included a stepping motor 3 having a pair of windings 4 and 5 and a rotor 6. The stepping motor 3 is adapted to turn the rotor 6 step by step in response to electrical pulses applied to the windings 4 and 5. The amount by which the rotor 6 turns in each step is independent of the amplitude of the electrical pulses applied to the windings 4 and 5 and the torque generated by the rotor 6 for each step is substantially constant, irrespective of the rate of occurrence of the electrical pulses applied to the windings 4 and 5.

In a particular type of stepping motor, known as a "Cyclonome," the electrical pulses applied to the terminals 4 and 5 alternate in polarity, and the rotor 6 turns through an angle of 18° upon receiving each electrical impulse. By providing the stepping motor 3 of Fig. 1 with electrical pulses having various repetition rates, the rotor 6 may be caused to step and turn over a wide range of speeds.

The motor drive system of Fig. 1 is arranged to receive alternating current from a source of supply such as a conventional power line. Thus, an alternating current wave of 60 cycles per second may be applied to the power supply terminals 7. Between the power supply terminals 7 and the stepping motor 3, the apparatus of Fig. 1 includes various frequency multipliers 8 and 9 and frequency dividers 10 and 11 which are adapted to be interconnected so as to generate electrical pulse trains having repetition rates bearing various multiple or fractional relationships to the frequency of the alternating wave applied to the terminals 7.

The first frequency multiplier 8 is adapted to generate a wave of twice the frequency of the alternating current wave applied to the terminals 7, i.e. 120 cycles per second. Connected to the output of the frequency multiplier 8 is a second frequency multiplier 9 which generates a wave having a frequency twice that of the alternating current wave from the first frequency divider 8 so as to provide a wave of four times the frequency of the wave applied to the terminals 7, i.e. 240 cycles per second.

Any one of the alternating current waves of line frequency, twice line frequency, or four times line frequency, may be passed to a pulse generator 12 by positioning the switch 23. The pulse generator 12 is adapted to provide a train of electrical pulses having a repetition rate equal to the frequency of the alternating current wave applied to its input. The pulses from the pulse generator 12 may be applied to a first frequency divider 10 which emits one pulse in response to every five pulses from the pulse generator 12. By means of a switch 13 the pulse train from the pulse generator 12 may be switched from the first frequency divider 10 to a second frequency divider 11 which provides an output pulse for every third one of the pulses supplied by the pulse generator 12. A switch 14 may be ganged with the switch 13 so that in the lower position the pulse train from the pulse generator 12 is applied directly to the second frequency divider 11, while in the upper position the pulse train from the pulse generator 12 is applied to the first frequency divider 10 with the output of the first frequency divider 10 being applied to the second frequency divider 11. In the upper position of the switches 13 and 14, a pulse is emitted by the second frequency divider 11 for every fifteenth pulse supplied by the pulse generator 12. By means of a switch 15 a pulse train may be derived directly from the output of the pulse generator 12, the first frequency divider 10, or the second frequency divider 11. Accordingly, by positioning the switches 13, 14, 15 and 23, the alternating current wave applied to the terminals 7 may be selectively multiplied by a factor of two or a factor of four and selectively divided by a factor of five, a factor of three, or a factor of fifteen. Thus, electrical pulses having repetition rates over a wide range may be derived from the apparatus of Fig. 1.

The pulse train passed by the switch 15 of Fig. 1 is applied to a bistable output circuit 16 which may comprise a conventional flip-flop circuit. By means of the bistable output circuit 16 alternate pulses are applied to the windings 4 and 5, to step the rotor 6 of the stepping motor 3 at a rate in accordance with the electrical pulse train passed by the switch 15.

In the apparatus of Fig. 1, the rotor 6 of the stepping motor 3 is mechanically linked as indicated by the dashed line 17 to a graphical recorder chart drive roller 18. For example, the linkage 17 may comprise a gear train having a ratio of 72:1 so that for 72 turns of the rotor 6, the drive roller 18 turns by one revolution. In a particular embodiment, the drive roller 18 may be of a suitable size to transport a record medium, such as a chart of graph paper 19, six inches for each revolution of the drum 18. In a conventional fashion, the chart 19 may be fed from a supply roll 21. A marking element 22 is arranged to be moved transversely of the chart 19 so as to produce a record of a variable as a function of time and a take-up roll 21 stores the recorded chart. The marking element 22 may be moved transversely in accordance with a variable by means of a conventional servo system (not shown). By positioning the switches 13, 14, 15 and 23, the speed of the chart 19 may be readily changed at will. The following table illustrates the frequency of a wave passed by the switch 15, the speed of the motor 3, and the speed of transport of the chart 19 for the various positions of the switches 13, 14, 15 and 23 in the embodiment of Fig. 1:

| Sw. 23 | Sw. 13 | Sws. 14 and 15 | Freq. | Motor r.p.m. | Chart Speed, inches/ minute |
|---|---|---|---|---|---|
| 1 | 3 | I | 240 | 720 | 60 |
| 2 | A | I | 120 | 360 | 30 |
| 1 | C | II | 80 | 240 | 20 |
| 1 | A | I | 60 | 180 | 15 |
| 3 | B | I | 48 | 144 | 12 |
| 2 | C | II | 40 | 120 | 10 |
| 2 | B | I | 24 | 72 | 6 |
| 1 | C | II | 20 | 60 | 5 |
| 3 | C | I | 16 | 48 | 4 |
| 1 | B | I | 12 | 36 | 3 |
| 2 | C | I | 8 | 24 | 2 |
| 1 | C | I | 4 | 12 | 1 |

In the schematic circuit diagram of Fig. 2 there is shown a motor drive system which is similar in operation to the drive system of the apparatus of Fig. 1. However, in the circuit of Fig. 2 only six of the speeds indicated above for the apparatus of Fig. 1 are included, since only these selected chart speeds were required in a particular embodiment.

In Fig. 2, alternating current waves from a conventional power source are applied to the primary winding of an input transformer 25. Alternating current of line frequency appears on a lead 26. A pair of diodes 27 and 28 function in conjunction with a capacitor 29 and the resistors 30 and 31 to provide an alternating current wave of twice the line frequency on a lead 32, which corresponds to the ripple voltage present in a full wave rectifier. A capacitor 33 and an inductance 34 are tuned to four times the line frequency so that an alternating current wave of four times the line frequency appears on the lead 35.

A series of double pole single throw switches 36, 37, 38, 39, 40 and 41 receive the alternating current waves appearing on the leads 26, 32 and 35 so as switch from one to another of the alternating current waves. Thus, the wave of line frequency appearing on the lead 26 is applied to one fixed contact of the switches 40 and 41, the wave of double line frequency appearing on the lead 32 is applied to a fixed contact of the switches 37 and 39, and the wave of four times line frequency appearing on the lead 35 is applied to a fixed contact of each of the switches 36 and 38.

The switches 36-41 may comprise conventional pushbutton selector type switches so that any one of the switches may be actuated by depressing one of the pushbuttons while at the same time releasing any other previously actuated switch.

Whenever any one of the switches 36-41 is actuated, a selected one of the alternating current waves appearing on leads 26, 32 and 35 is passed to the base of a transistor amplifier and pulse generator 42 via a resistor 43. In the embodiment of Fig. 2, the switch 36 corresponds to a chart speed of 60 inches per minute, the switch 37 corresponds to a chart speed of 30 inches per minute, the switch 38 corresponds to a chart speed of 12 inches per minute, the switch 39 corresponds to a chart speed of 6 inches per minute, the switch 40 corresponds to a chart speed of 3 inches per minute, and the switch 41 corresponds to a chart speed of one inch per minute.

For the highest chart speed of 60 inches per minute, the switch 36 is actuated to pass the wave of four times line frequency to the transistor amplifier 42 and electrical pulses appearing across a load resistor 44 are returned to the switch 36 via a lead 45. Pulses from the lead 45 are passed by the switch 36 to the base of a transistor pulse amplifier 46 via a coupling capacitor 47 and a lead 48.

For the next lower chart speed of 30 inches per minute, a switch 37 is depressed so that a wave of twice the line frequency appearing on the lead 32 is passed to the transistor amplifier 42 and the pulses appearing on the lead 45 are passed to the final stage amplifier 46.

For the next lower chart speed of 12 inches per minute, the switch 38 is closed which supplies the four times line frequency wave on the lead 45 to the transistor amplifier 42. However, in this case the output pulses from the transistor amplifier 42 are not returned directly to the final stage amplifier 46 but are passed to a pulse shaping transistor amplifier 49 via a coupling capacitor 50. The coupling capacitor 50 cooperates with a resistor 51 to form a differentiating circuit so that a series of pulses appears across the variable load resistor 52 and fixed load resistor 53 having a precise, predetermined amplitude and configuration.

By adjusting the movable contact on the variable resistor 52, pulses of a selected amplitude are passed by a coupling capacitor 54 and are clamped to a reference voltage level by means of a diode 55. An integrating capacitor 56 is charged by the pulses and a diode 57 functions to prevent the capacitor 56 from discharging between pulses.

The capacitor 56 forms a portion of a step counter which includes a transistor 58 and a transformer 59. The transistor 58 is normally biased in a non-conductive state by a potential appearing across a voltage divider including the resistors 60 and 61. When the charge on the integrating capacitor 56 reaches a predetermined level, the transistor 58 commences to conduct and a current flows through the primary winding of the transformer 59 which induces a voltage across the secondary of the transformer 59. The induced voltage tends to increase the conduction through the transistor 58 so that the action is cumulative in a fashion similar to that of a blocking oscillator with the transistor 58 being rapidly placed in a condition of conduction. The increased current flow through the transistor 58 produces a voltage pulse across a load resistor 62.

A bypass capacitor 63 functions to return the emitter of the transistor 58 to ground reference potential for alternating current so that the surge of current through the transistor 58 encounters a low impedance path around the biasing resistor 61. A diode 103 is connected across the secondary of the transformer 59 so as to cancel the back swing of the voltage pulse whereby only pulses of a single polarity appear on a lead 64.

At the conclusion of the voltage pulse across the resistor 62, the integrating capacitor 56 is discharged, and the circuit is ready to receive another series of electrical pulses. Accordingly, the step counter functions as a frequency divider which generates an electrical pulse across the resistor 62 in response to a predetermined number of pulses from the transistor amplifier 42. In the particular embodiment illustrated in Fig. 2, the repetition rate of the pulses is divided by a factor of five so that one pulse appears across the resistor 62 for every five pulses from the transistor amplifier 42.

When the switch 38 is depressed for a chart speed of 12 inches per minute, the pulses appearing on the lead 64 are passed to the transistor amplifier 46 via the lead 48. Thus, when the switch 38 is depressed, a wave of four times line frequency is divided by a factor of five to produce a pulse train having a repetition rate equal to four-fifths of line frequency.

Where a chart speed of six inches per minute is desired, the switch 39 is depressed, which applies to the amplifier 42 an alternating current wave of twice line frequency appearing on the lead 32. This frequency is divided by a factor of five through the action of the step counter with a pulse train of two-fifths line frequency appearing on the lead 64. This pulse train is passed via the switch 39 to the final stage amplifier 46 via the lead 48 and the coupling capacitor 47.

Where a chart speed of three inches per minute is desired, the line frequency wave appearing on the lead 26 is passed via the switch 40 to the amplifier 42 and a pulse train equal to a frequency of one-fifth the line frequency appears on the lead 64 and is passed via the lead 40, the lead 48 and the coupling capacitor 47 to the final stage amplifier 46.

In addition to the pulse train on the lead 64, the step counter also supplies a pulse train to a transistor amplifier 65 which produces a corresponding series of pulses having a predetermined amplitude and configuration across the variable resistor 66 and the fixed resistor 67. The amplitude of the pulses may be regulated by adjusting the tap on the resistor 66 and a second step counter is actuated for every third pulse. Circuitry of the second step counter is substantially similar to that described previously with respect to the first step counter including the transistor 38.

Accordingly, the pulses from the transistor amplifier 65 are passed by a coupling capacitor 68, clamped by a diode 69 and charge a capacitor 70 through a diode 71. When the charge on the capacitor 70 reaches a predetermined level, a step counter transistor 72 is rendered conductive, and current flows through the primary winding of a transformer 73. The current flow through the primary winding induces a voltage in the secondary winding of the transformer 73 so that the transistor 72 is rendered fully conductive. As before, the transistor 72 is biased in a nonconducting state by a voltage divider, including the resistors 74 and 75, and a bypass condenser 76 allows the pulse of current through the transistor 72 to bypass the resistor 75. A diode 76 cancels the back swing across the secondary of the transformer 73. By a proper selection of the amplitude and configuration of the charging pulses passed by the capacitor 68, a pulse appears across the load resistor 77 for every third pulse which is passed by the transistor amplifier 65.

Accordingly, when the train of pulses is passed both through the first and second step counters of the transistors 58 and 72, the rate of pulse repetition is divided by a factor of five in one step counter and three in the second step counter, so that a pulse appears on lead 78 for every fifteenth pulse applied to the first transistor amplifier 42.

For chart speeds of one inch per minute, the switch 41 is depressed, which applies the line frequency wave from the lead 26 to the first transistor amplifier 42 and a pulse train having a frequency equal to one-fifteenth of line frequency appears on the lead 78 and is passed to the final stage transistor amplifier via the lead 48 and the coupling capacitor 47.

Thus, by actuating any one of the several switches 36–41, a pulse train may be applied to the final stage amplifier 46 ranging in frequency between four times line frequency and one-fifteenth line frequency. The transistor amplifier 46 passes a pulse train to a pair of diodes 79 and 80 via a network comprising the resistors 81 and 82 and a capacitor 83 and a resistor 84 returns the base of the transistor amplifier to ground reference potential.

The diodes 79 and 80 are connected in the input circuits of a bistable of flip-flop circuit including a pair of transistors 85 and 86. The transistors 85 and 86 are cross-coupled by the resistors 87 and 88 so that the circuit has two stable conditions of operation, in each of which one only of the transistors is in a condutive condition. Depending upon which one of the transistors 85 and 86 is conducting, one of the diodes 79 and 80 is capable of passing a pulse to one of the flip-flop diodes while the other one of the diodes is biased to cut-off. Thus, by means of the diodes 79 and 80, the alternate ones of the pulses from the final stage amplifier 46 are passed to the flip-flop circuit via the resistors 89 and 90 so as to reverse the condition of conduction of the flip-flop circuit.

The flip-flop circuit of the transistors 85 and 86 functions to alternately apply motor drive pulses to the windings 91 and 92 which form a part of a cyclonome motor as described previously. The resistors 93, 93A, 94 and 94A and the capacitors 95 and 96 function to shape the pulses provided by the flip-flop circuit so as to assure a positive actuation of the stepping motor in accordance with each received pulse.

Although the circuit of Fig. 2 may be energized from any suitable source of operating potential, the particular circuitry includes means for deriving operating potentials from the source of alternating current. Accordingly, the motor actuating flip-flop circuit of the transistors 85 and 86 receives operating potential from a full wave rectifier including a pair of diodes 97 and 98. A filter condenser 99 functions to smooth the direct current in a conventional fashion. In like manner, the amplifier transistors 42, 51, 65 and 46, and the stepping counter transistors 58 and 72 receive operating potential from another full wave rectifier including the diodes 100, 101. A filter condenser 102 functions to smooth the direct current operating potential as before.

The following circuit component values for the apparatus of Fig. 2 are given by way of example, being exemplary only of one workable embodiment:

| | |
|---|---|
| Diodes 27, 28, 100, 101 | 1N91. |
| Diodes 55, 57, 69, 71, 76, 79, 80, 103 | 1N34A. |
| Diodes 97, 98 | 4JA211FC1AC1 (General Electric). |
| Transistors 42, 58, 72 | 2N265 (P-N-P). |
| Transistors 46, 49, 65 | 2N169A (N-P-N). |
| Transistors 85, 86 | 2N277 (P-N-P). |
| Resistor 43 | 22,000 ohms. |
| Resistor 30 | 10,000 ohms. |
| Resistor 84 | 4,700 ohms. |
| Resistor 44 | 3,300 ohms. |
| Resistors 81, 82 | 2,200 ohms. |
| Resistors 53, 62, 67 | 1,500 ohms. |
| Resistors 31, 52, 60, 66, 74 | 1,000 ohms. |
| Resistors 87, 88 | 470 ohms. |
| Resistors 51, 61, 75, 89, 90 | 220 ohms. |
| Resistors 93, 94, 93A, 94A | 10 ohms. |
| Capacitors 95, 96, 99 | 1,000 microfarads. |
| Capacitor 102 | 500 microfarads. |
| Capacitor 63 | 25 microfarads. |
| Capacitors 29, 56, 70, 83 | 5 microfarads. |
| Capacitors 50, 54, 68 | .25 microfarad. |
| Capacitor 47 | .10 microfarad. |
| Capacitor 33 | Selected to resonate with inductance 34 at four times line frequency. |

Commercially available cyclonome stepping motors are generally wound to be operated from pulses derived from a high impedance source, such as electron tubes. In the apparatus of Fig. 2, where the cyclonome motor is driven from a relatively low impedance low voltage source, such as the flip-flop circuit including the transistors 85 and 86, a conventional high impedance stepping motor may be re-wound using a larger size of wire. In a particular embodiment corresponding to Fig. 2, No. 24 wires was substituted for the wire of the original windings.

A particular advantage of the apparatus of the invention is that where the stepping motor is used to transport a strip of graph paper in a graphical recorder, the stepping motor may be driven over a range of speeds and a fixed ratio gear train may be used to link the stepping motor to the chart drive. By this means, the individual increments or steps through which the stepping motor shaft turns in response to each individual electrical impulse become so small as to be unnoticeable as the chart. Accordingly, the chart is transported at a substantially constant velocity even though the drive motor is being stepped discretely in accordance with electrical impulses. In addition, since the repetition rate of the electrical impulses may be changed at will and precisely controlled to bear a predetermined multiple or fractional relationship to the line frequency, a degree of versatility is possible not previously known. Also, since the rate at which the motor is driven is controlled without any mechanical speed changing device, a high degree of reliability and simplicity of construction is achieved.

Although the apparatus of the invention has been described using frequency multipliers and frequency dividers which are adapted to drive the apparatus at specific predetermined speeds, it will be appreciated that the apparatus is not limited thereto. Nor is the invention limited to the transporting of a record medium in a graphical recorder. Accordingly, the invention should be given the benefit of the full scope of the annexed claims including all the apparatus described above and its equivalents.

What is claimed is:

1. In a graphical recorder, means for transporting a record medium past a fixed station, including the combination of a stepping motor, a pair of terminals for receiving an alternating current wave of a fixed frequency from a power source, means connected between the terminals and the stepping motor for selectively generating alternating current waves having frequencies bearing selected fractional and multiple relationships with respect to the frequency of the wave applied to the input terminal, and a record medium drive mechanism linked to the stepping motor whereby a record medium may be transported over a range of speeds in accordance with the frequency of the alternating current wave applied to the stepping motor.

2. In a motor drive system, the combination of a stepping motor, a pair of terminals for receiving an alternating current wave of a fixed frequency from a power source, means connected between the terminals and the stepping motor for selectively generating alternating current waves having frequencies bearing selected fractional and multiple relationships with respect to the frequency of the wave applied to the input terminals, and means energizing the stepping motor at a rate determined by the frequency of one of said generated alternating current waves.

3. In a graphical recorder, means for transporting a record medium past a fixed station, including the combination of a stepping motor which is adapted to advance a record medium by a predetermined amount in response to an electrical pulse; a pair of terminals for receiving an alternating current wave with a predetermined frequency from a source of power; a plurality of frequency multipliers coupled to the input terminals; a plurality of frequency dividers; means interconnecting the input terminals, the frequency multipliers, and the frequency dividers to generate various selected alternating current waves having frequencies which bear multiple and fractional relationships to the frequency of the wave applied to the input terminals; and means coupling the interconnecting means to the stepping motor for applying electrical pulses having selected repetition rates to the stepping motor whereby a record medium may be transported at selected velocities in accordance with the position of the interconnecting means.

4. In a graphical recorder, means for transporting a record medium past a fixed station, including the combination of a stepping motor which is adapted to turn a motor by a predetermined amount in response to an electrical pulse; a pair of terminals for receiving an alternating current wave with a predetermined frequency from a source of power; a plurality of frequency multipliers coupled to the input terminals; a plurality of frequency dividers; means interconnecting the input terminals, the frequency multipliers, and the frequency dividers to generate various selected alternating current waves having frequencies which are multiples and fractional parts of the frequency of the wave applied to the input terminals; means coupling the interconnecting means to the stepping motor for applying electrical pulses having selected repetition rates to the stepping motor; a chart drive mechanism; and a gear train linked between the stepping motor and the chart drive mechanism whereby a record medium may be transported at selected velocities in accordance with the position of the interconnecting means.

5. In a motor drive system, the combination of a stepping motor which is adapted to turn a shaft in response to electrical pulses, a pair of input terminals which are adapted to receive an alternating current wave from a power source, a first frequency multiplier which is adapted to generate a wave having a frequency twice the frequency of the alternating current wave applied to the input terminals, a second frequency multiplier which is adapted to generate a wave having a frequency twice the frequency of the wave generated by the first frequency multiplier, a first step counter which is adapted to generate an alternating current wave having a frequency one-fifth the frequency of an alternating current wave applied to the step counter, a second step counter which is adapted to generate an alternating current wave having a frequency equal to one-third the frequency of the alternating current wave applied to the second step counter, means interconnecting the first and second frequency multipliers and the first and second step counters to generate alternating current waves having selected frequencies bearing a selected multiple and fractional relationship to the frequency of an alternating current wave applied to the input terminals, a pulse generator coupled to the interconnecting means for generating electrical pulses, and means coupled to the pulse generator for energizing the stepping motor at a selected rate.

6. In a graphical recorder, means for transporting a record medium past a fixed station, including the combination of a stepping motor which is adapted to turn a shaft in response to electrical pulses, a pair of input terminals which are adapted to receive an alternating current wave from a power source, a first frequtncy multiplier which is adapted to generate a wave having a frequency twice the frequency of the alternating current wave applied to the input terminals, a second frequency multiplier which is adapted to generate a wave having a frequency twice the frequency of the wave generated by the first frequency multiplier, a first step counter which is adapted to generate an alternating current wave having a frequency one-fifth the frequency of an alternating current wave applied to the step counter, a second step counter which is adapted to generate an alternating current wave having a frequency equal to one-third the frequency of the alternating current wave applied to the second step counter, means interconnecting the first and second frequency multipliers and the first and second step counters to generate alternating current waves having selected frequencies bearing a selected multiple and fractional relationship to the frequency of an alternating current wave applied to the input terminals, a pulse generator coupled to the interconnecting means for generating electrical pulses, means coupled to the pulse generator for energizing the stepping motor at a selected rate, and means linked to the stepping motor for transporting a record medium at a selected rate.

7. In a graphical recorder, means for transporting a record medium past a fixed station, including the combination of a stepping motor which is adapted to advance a shaft by a predetermined amount in response to each of a series of electrical pulses; a pair of terminals for receiving an alternating current wave of fixed frequency from a source of power; a first frequency multiplier for generating an alternating current wave of twice the frequency of the wave applied to the terminals; a second frequency multiplier for generating a wave having four times the frequency of the wave applied to the terminals; a first step counter for generating an electrical wave having a frequency equal to one-fifth of the frequency of the wave applied to the first step counter; a second step counter for generating an alternating current wave having a frequency equal to one-third of a wave applied to the second step counter; a three-position switch connected to the input terminals, the first frequency multiplier and the second frequency multiplier for selectively deriving alternate current waves having a frequency equal to, twice, and four times the frequency of the wave applied to the input terminals; and means interconnecting the three-position switch, the first step counter, the second step counter, and stepping motor for selectively applying electrical pulses to the stepping motor whereby the stepping motor may be driven at any selected one of several speeds to transport a record medium at a selected velocity.

8. A motor drive mechanism including the combination of a stepping motor which is adapted to rotate a predetermined amount in response to individual electrical pulses, a pair of terminals for receiving an alternating current wave of a predetermined frequency from a source of power, a plurality of frequency multipliers coupled to the input terminals, a plurality of frequency dividers, means interconnecting the input terminals, the frequency multipliers and the frequency dividers to generate various selected alternating current waves having frequencies which bear multiple and fractional relationships to the frequency of the wave applied to the input terminals, and means coupling the interconnecting means to the stepping motor for applying electrical pulses having selected repetition rates to the stepping motor.

9. In a motor drive system, the combination of a stepping motor for turning a shaft in response to electrical pulses, a pair of input terminals for receiving an alternating current wave from a power source, a first frequency multiplier for generating a wave having a frequency twice that of the frequency of the alternating current wave applied to the input terminals, a secondary frequency multiplier for generating a wave having a frequency twice that of the frequency of the wave generated by the first frequency multiplier, a first step counter for generating an alternating current wave having a frequency one-fifth the frequency of an alternating current wave applied to the step counter, a second lationship to the frequency of an alternating current wave having a frequency equal to one-third the frequency of the alternating current wave applied to the second step counter, means interconnecting the first and second frequency multipliers and the first and second step counters to generate alternating current waves having selected frequencies bearing a selected multiple and fractional relationship to the frequecy of an alternating current wave applied to the input terminals, a pulse generator coupled to the interconnecting means for generating electrical pulses, and means coupled to the pulse generator for energizing the stepping motor at a selected rate.

10. In a motor drive system, the combination of a pair of terminals adapted to receive alternating current from a source, a stepping motor to provide incremental output rotations in response to applied pulses, a number of pulse generators for providing pulses at different repetition rates in response to actuating signals, means coupled to the pair of terminals and to the pulse generators for actuating the pulse generators at rates dependent upon the alternating current from the source, and means for operating the stepping motor with pulses provided from at least one of the pulse generators.

11. In a motor drive system, the combination of a stepping motor operable in response to applied pulses to provide incremental movements, a pair of input terminals adapted to receive alternating signals from a power source, a group of frequency conversion circuits providing different frequency conversion factors relative to the frequency of a source, means for selectively operating at least one of the frequency conversion circuits from alternating signals derived from the input terminals, and circuit means coupling at least one of the frequency conversion circuits to the stepping motor in a selected frequency relation to the frequency of the alternating signal.

References Cited in the file of this patent
UNITED STATES PATENTS

| | | |
|---|---|---|
| 2,706,270 | Steele | Apr. 12, 1955 |
| 2,750,548 | Van Dalen | Jan. 12, 1956 |
| 2,791,734 | Kieffert | May 7, 1957 |
| 2,809,335 | Welch | Oct. 8, 1957 |

UNITED STATES PATENT OFFICE
CERTIFICATE OF CORRECTION

Patent No. 2,945,997

July 19, 1960

Charles J. Kennedy

It is hereby certified that error appears in the printed specification of the above numbered patent requiring correction and that the said Letters Patent should read as corrected below.

Column 1, line 65, for "varing" read -- varying --; column 6, line 19, for "on lead" read -- on a lead --; column 7, line 40, for "as", second occurrence, read -- at --; column 10, line 15, for "secondary" read -- second --; line 22, for "lationship to the frequency of" read -- step counter for generating --.

Signed and sealed this 27th day of December 1960.

(SEAL)
Attest:

KARL H. AXLINE
Attesting Officer

ROBERT C. WATSON
Commissioner of Patents